UNITED STATES PATENT OFFICE.

JOHN EDWARD STEAD, OF MIDDLESBROUGH, ENGLAND.

PHOSPHATE AND METHOD OF MAKING SAME.

SPECIFICATION forming part of Letters Patent No. 589,197, dated August 31, 1897.

Application filed May 22, 1895. Serial No. 550,254. (No specimens.)

*To all whom it may concern:*

Be it known that I, JOHN EDWARD STEAD, a subject of the Queen of Great Britain, residing at Middlesbrough, county of York, England, have invented Improvements in Processes of Increasing the Solubility of Phosphates, of which the following description is a specification.

This invention has for its object the production of a process of increasing the solubility of phosphates, whereby phosphates so treated are adapted for use as fertilizers or manure and readily soluble in the solvents existing in the soil.

The common phosphates of nature, such as apatite and the bone phosphates found in Florida and the Carolinas, consist of tribasic phosphate of lime, ($3CaO, P_2O_5$,) a substance which does not readily dissolve in the solvents existing in the soil, and in order to make such substance soluble when used as a fertilizer or manure various processes are used to attain that object.

In the course of my experiments I have discovered that if this insoluble tribasic phosphate of lime be melted with silica or silicious minerals it is changed into soluble silico-phosphates. I have also discovered that soluble double salts can be produced cheaply by melting the natural phosphates specified with silica and lime or an equivalent of limestone or with silicate of lime or with substances which will form silicate of lime when thus treated. They are also formed when such natural phosphates are melted with natural minerals, such as marl, containing silicious matter and carbonate of lime.

The best results attained, so far as I have experimented, were obtained by melting together natural phosphate with such a proportion of lime or its equivalent of limestone, silica, or with a silicate of calcium or a compound rich in such silicate, so that each three hundred and ten parts of tribasic phosphate of lime may be associated in the melted mixture with between fifty-eight and one hundred and sixteen parts of monocalcic silicate.

All natural phosphates may be treated by my process, but as they are not always pure, inasmuch as they are frequently contaminated with silica-carbonate of lime, &c., I do not invariably adhere to any fixed proportions of lime or limestone and silica or of the calcic silicate in working my invention.

My object is to ultimately obtain a compound in which the ratio of the tribasic phosphate of lime in the mineral phosphate to the silicate is as three hundred and ten of the former to between fifty-eight and one hundred and sixteen of the latter.

If the natural phosphate contains carbonate of lime, an exact equivalent proportion less of lime or limestone is added, together with the proper proportion of silica, so that the ultimate mixture may have the ratio of the phosphate to the silicate in the proportions previously specified. If, on the other hand, silica is present, an equivalent proportion less of silica is added with the lime or limestone, or silicate of lime, so that the proportions of phosphate to silicate may be in the ratio previously specified.

As the slags from iron-making blast-furnaces practically consist of silicate of calcium, such material is admirably adapted for melting with natural phosphates.

All slags containing in greatest quantity silicate of calcium are useful for my process.

Mineral phosphates I also melt with slags from the basic Bessemer and basic open-hearth process, which are too low in phosphoric acid to be of value as fertilizers, together with a sufficient quantity of silicious matter or silica in such proportions as to give three hundred and ten parts of tribasic phosphate of lime to between fifty-eight and one hundred and sixteen parts of monocalcic silicate in the melted mixture.

Instead of using separate proportions of silicious matter and lime or equivalent of limestone, when convenient I use natural minerals containing carbonate of lime and silicious matter, such as marl, which, when melted, produce silicate of calcium.

While my process may be carried out in many different ways, I prefer to melt the mixture, in whatever way it may be composed, in a cupola-furnace, as while very good results are obtained by melting in an open-hearth furnace it is more expensive.

The molten product may be granulated in water and pulverized in any suitable manner, when it is ready for use as a fertilizer or manure without further treatment.

The compounds containing three hundred and ten parts tribasic phosphate to between fifty-eight and one hundred and sixteen parts of monocalcic silicate can be expressed by the chemical formula $$[(CaO)_3P_2O_5]_2 + CaO.SiO_2$$

and $$(CaO)_3P_2O_5 + CaO.SiO_2.$$

The mixtures containing intermediate proportions of calcium silicate, between fifty-eight and one hundred and sixteen parts, may be considered as mixtures of these two double salts.

I have discovered that the corresponding compounds containing in place of tribasic phosphate of lime the tetrabasic phosphate are equally soluble to the compounds above mentioned and have the chemical constitution expressed by the formula $$[(CaO)_4P_2O_5]_2 + CaO.SiO_2$$

and $$(CaO)_4P_2O_5 + CaO.SiO_2.$$

By using an addition of fifty-six parts of lime to the three hundred and ten parts of tribasic phosphates together with the various silicious and calcareous matters mentioned under the description of the tribasic soluble compounds on melting them together I obtain soluble compounds containing $$[(CaO)_4P_2O_5]_2 + CaO.SiO_2$$

and $$(CaO)_4P_2O_5 + CaO.SiO_2.$$

Crystals of the latter compound I have separated and have proved to be a true chemical double salt.

In order to reduce the melting-point and facilitate the melting of the various mixtures previously referred to, I add compounds rich in iron, such as mill-cinder from iron-heating furnaces, and other iron silicates and minerals containing oxid of iron, and in other cases, when such material is not procurable, I use either silicate of magnesia or minerals containing high quantities of magnesia.

I claim—

1. The herein-described process of increasing the solubility of normally insoluble phosphates which consists in melting them with silicious and calcareous matter in proportion to yield compounds containing the ratio of three hundred and ten of tribasic phosphate of lime to between fifty-eight and one hundred and sixteen of monosilicate of lime, substantially as described.

2. A silico-phosphate readily soluble in solvents existing in the soil, for use as a fertilizer, having substantially the formula $$(CaO)_4P_2O_5 + CaO.SiO_2 = Ca_5P_2SiO_{12},$$

capable of isolation in characteristic crystals in the form of a double salt, substantially as described.

In testimony whereof I have signed my name to this specification in the presence of two subscribing witnesses.

JOHN EDWARD STEAD.

Witnesses:
J. R. STUBBS,
JOHN W. C. LANGFIELD.